Dec. 9, 1924.
C. J. NELSON ET AL
1,518,868
BODY GAUGING HAMMER
Original Filed Aug. 30, 1920    2 Sheets-Sheet 1
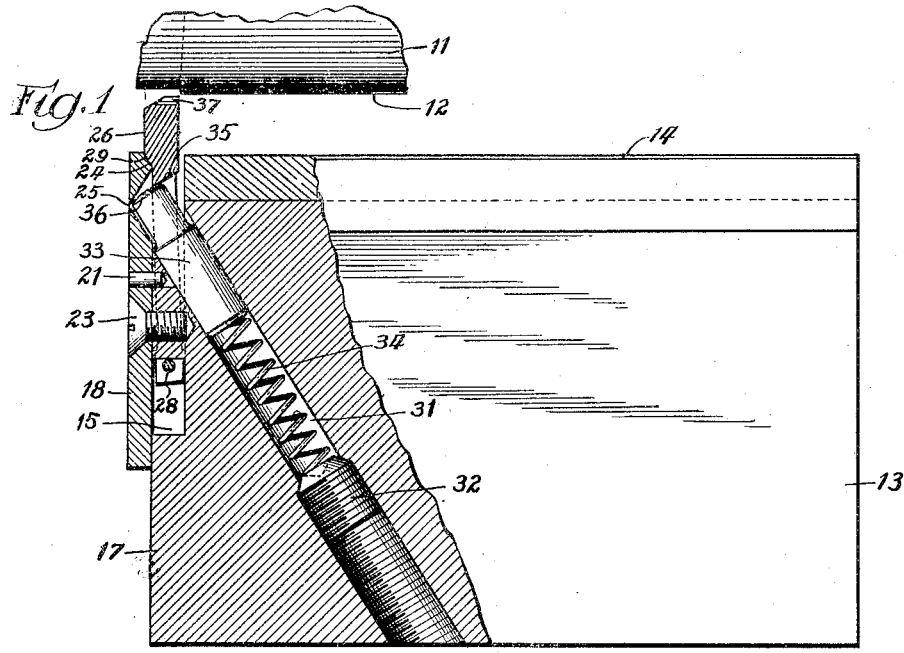
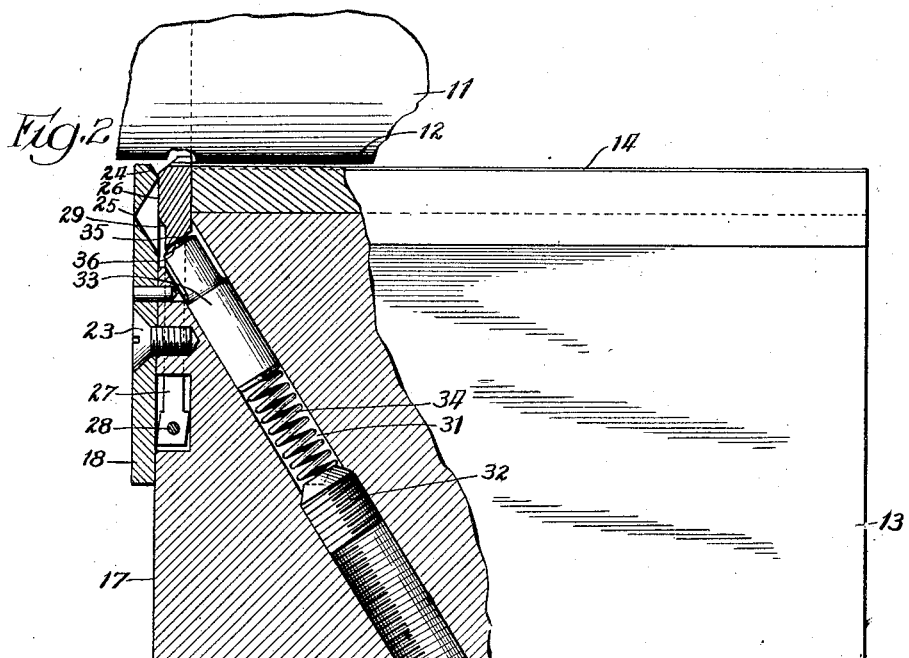
Inventor
Charles J. Nelson and
Magnus E. Widell
By Munday, Clarke
& Carpenter Attys.

Dec. 9, 1924.                                                1,518,868
C. J. NELSON ET AL
BODY GAUGING HAMMER
Original Filed Aug. 30, 1920      2 Sheets-Sheet 2
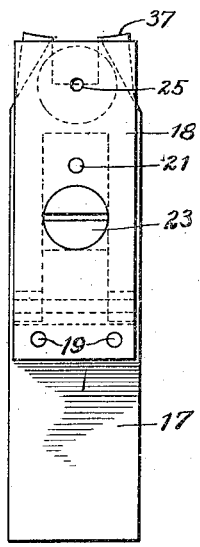
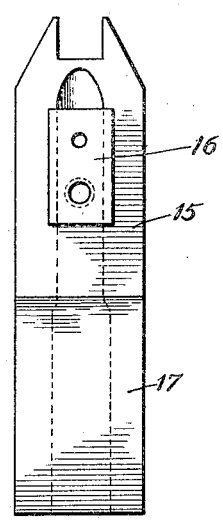
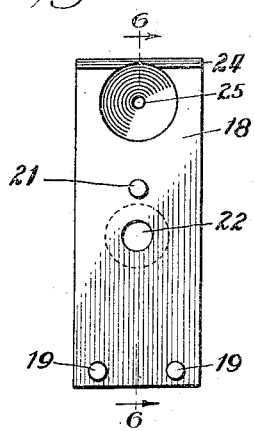
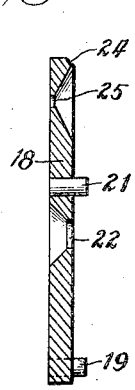
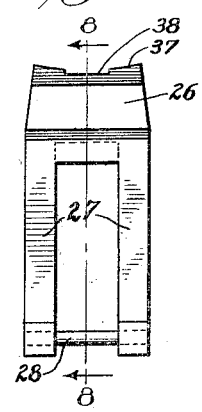
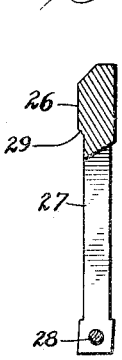
Inventor
Charles J. Nelson and Magnus E. Widell
By Munday, Clarke & Carpenter Atty's.

Patented Dec. 9, 1924.

1,518,868

UNITED STATES PATENT OFFICE.

CHARLES J. NELSON AND MAGNUS E. WIDELL, OF MAYWOOD, ILLINOIS, ASSIGNORS TO AMERICAN CAN COMPANY, OF NEW YORK, N. Y., A CORPORATION OF NEW JERSEY.

BODY-GAUGING HAMMER.

Application filed August 30, 1920, Serial No. 407,004. Renewed May 5, 1924.

*To all whom it may concern:*

Be it known that we, CHARLES J. NELSON and MAGNUS E. WIDELL, citizens of the United States, residing in Maywood, in the county of Cook and State of Illinois, have invented a new and useful Improvement in Body-Gauging Hammers, of which the following is a specification.

This invention relates in general to machines for making can bodies and has more particular reference to machines of this character wherein the part or all of the side seam is closed by a hammer blow received upon interengaging hooked edges. Can bodies of this sort are frequently constructed with a long central seam part formed by interlocked compressed edge portions, the ends of the seam being constructed by soldering together overlapping edges to permit of flanging preparatory to the formation of double seams with the can closures. It is highly important, as will be readily understood, that the overlapped edges be in accurate registration when the seam is finally hammered or bumped into form.

It is a principal object of our present invention to provide an improved form of apparatus for accomplishing this result, the broader invention being described and claimed in an application of James A. Gray, co-pending herewith, which application has Serial No. 405,810, and was filed on Aug. 25, 1920.

This invention has for its object more particularly the provision of a more durable apparatus and one which may be more cheaply provided than the one shown and described in the Gray application.

Numerous other objects and advantages of the invention will be apparent as it is better understood from the following description, which, taken in connection with the accompanying drawings, discloses a preferred embodiment thereof.

Referring to the drawings,

Figure 1 is a side elevation of a seam closing hammer, the parts being shown in section to disclose the registering and a fragmentary section of the horn being included. The arrangement of the parts in this view is that assumed prior to the hammer blow;

Fig. 2 is a similar view showing the arrangement of the parts after the hammer blow;

Fig. 3 is an end elevation of the hammer when equipped with our invention;

Fig. 4 is an end view of the hammer body with the hammer blade or head and other parts removed;

Fig. 5 is an elevation of the facing plate, looking toward the left in Fig. 1;

Fig. 6 is a section on the line 6—6 of Fig. 5;

Fig. 7 is a view similar to Fig. 5, and looking in the opposite direction; and

Fig. 8 is a section taken substantially on the line 8—8 of Fig. 7.

For the purpose of illustrating our invention we have shown a portion of a body forming horn 11 about which the body blank 12 is adapted to be wrapped, with its hooked edges engaged in the usual manner. We have also shown a hammer 13, the general construction of which is no part of our present invention, and which is provided with the usual blade or hammer head 14. The upper part of the left hand end of the hammer is cut away at 15 except for a boss 16 of rectangular shape and centrally located. A facing plate, shown more particularly in Figs. 5 and 6, is provided to fit against the boss and to overlap the lower part 17. This facing plate, indicated by reference character 18, is provided with three pins 19—21 and has a central aperture 22 adapted to receive a holding screw 23. At the top its right hand corner or edge is cut away to provide a cam surface 24 and just therebeneath a conical recess 25 is provided. The registering member consists of a head 26 and two downwardly extending legs 27 connected at their bottom by a pin 28. A cam shoulder 29 is formed on the head, which cam shoulder is adapted, when the parts are assembled in normal position, to rest on the cam surface of the plate 18. When the parts are thus arranged the legs 27 extend down on opposite sides of the boss 16 and the pin 28 is arranged therebeneath so that the protruding member embraces said boss and is held against withdrawal from the recess provided between the facing plate and the hammer end by cutting away the end of the hammer as indicated at 15.

An angularly arranged or inclined recess 31 extends through the hammer and is adapted to be closed by a screw plug 32. In the upper end of this recess is mounted a plunger 33 pressed out by a spring 34 between it and the screw plug 32. The arrangement of the aperture 31 and the conical recess 25 of the facing plate is such that the upper end of this plunger is pushed toward and into the recess 25 when the parts are extended. The end of the plunger engages the bottom face of the head 26 and between the legs 27 pushing the plunger up and out of the hammer as shown in Fig. 1. This bottom face, indicated by reference character 35 is inclined and the head of the plunger is rounded as indicated at 36 to reduce wear of the parts. When the hammer ascends or proper relative motion is produced between the hammer and the horn, the upper edge of the registering member engages the horn just back of the overlapping edges of the blank. Continued hammer movement causes the cam surfaces 24 and 29 to ride over each other swinging or moving the registering member transversely of the hammer blow. This movement causes the upper edge of the registering member to engage the body blank at both sides of the intended seam and pushing the body blank over a slight distance brings the overlapping edges in accurate registration.

The upper edge of the hammer is curved as indicated at 37 in accordance with the curvature of the horn and is recessed centrally at 38 so that the engagement is at each side of the overlapping edges and in each instance with a single thickness of metal. Relatively little reformation is required to adapt the hammer to receive the registering device and it will be noted that the action of the plunger 33 is directed toward the plane of cam movement of the cam surfaces 24 and 29.

It is thought that the invention and many of its attendant advantages will be understood from the foregoing description, and it will be apparant that various changes may be made in the form, construction and arrangement of the parts without departing from the spirit and scope of the invention or sacrificing all of its material advantages, the form hereinbefore described being merely a preferred embodiment thereof.

We claim:

1. In an apparatus for making can bodies, the combination of a horn about which a body blank is adapted to be wrapped, a seam closing hammer, a member protruding from the seam closing hammer and adapted to bring the edges of a blank wrapped about the horn to accurate registration prior to the striking of the seam closing blow, and an angularly arranged spring-pressed member pushing said protruding member into extended position.

2. In an apparatus for making can bodies, the combination of a horn about which a body blank is adapted to be wrapped, a seam closing hammer, a member protruding from the hammer for bringing the overlapped seam edges to accurate registration prior to the seaming blow, said hammer and member having oblique engaging cam faces, and a spring-pressed member angularly arranged with respect to the hammer movement and directly resisting the cam movement.

3. In an apparatus for making can bodies, the combination of a horn about which a body blank is adapted to be wrapped, a seam closing hammer having its end recessed and provided with a boss, a recess closing plate engaging the boss and secured thereto, a movable member embracing the boss and normally extending above the hammer, and yielding means pressing said member outwardly, said member and said plate having interengaging cam surfaces for moving the member transversely of the hammer blow to bring the seam edges into accurate registration.

4. The combination with a horn and a reciprocating element movable laterally to and from the horn for uniting the edges of sheet metal, of a gauge for engaging the edge of the sheet metal and automatic means for moving the gauge radially and also longitudinally, said moving means acting in a direction which is at an angle to the direction of said radial movement of the gauge, whereby the gauge is moved to the edge of the sheet metal and moves the latter along the horn if it should be out of place.

CHARLES J. NELSON.
MAGNUS E. WIDELL.